United States Patent [19]
Hougen

[11] 3,880,653
[45] Apr. 29, 1975

[54] CHLORINE LEACH PROCESS

[75] Inventor: Leif Reidar Hougen, Kristiansand, Norway

[73] Assignee: Falconbridge Nickel Mines Limited, Toronto, Ontario, Canada

[22] Filed: Mar. 18, 1971

[21] Appl. No.: 125,682

[52] U.S. Cl.................. 75/101 R; 75/117; 75/118; 75/119; 75/121; 423/581; 423/562; 423/565
[51] Int. Cl.. C22b 15/00; C01g 55/00; C22b 23/04
[58] Field of Search.......... 75/101 R, 117, 118, 119; 23/1 B, 86, 117

[56] References Cited
UNITED STATES PATENTS

| | | | |
|---|---|---|---|
| 2,835,569 | 5/1958 | Reynaud et al. | 75/118 |
| 3,199,949 | 8/1965 | Clerbois et al. | 23/86 |
| 3,486,847 | 12/1969 | Steinhausen | 23/117 |
| 3,627,482 | 12/1971 | Olson et al. | 75/101 R X |
| 3,647,261 | 3/1972 | Stenger et al. | 75/101 R X |
| 3,652,265 | 3/1972 | Marschik | 75/119 |
| 3,767,760 | 10/1973 | Hougen et al. | 75/101 R |

FOREIGN PATENTS OR APPLICATIONS

1,038,763  9/1958  Germany .............................. 75/101

Primary Examiner—Edward Stern
Attorney, Agent, or Firm—Richard J. Hicks

[57] ABSTRACT

A method for selectively recovering metals from generally sulphidic particulate materials containing metals selected from nickel, copper and precious metals in which the particulate material is preferentially leached in an agitated chloride solution containing cuprous ions by the action of chlorine. The redox potential of the solution increases upon feeding chlorine thereto and decreases upon feeding particulate material thereto, and the rate of feeding of chlorine is controlled relative to the rate of feeding of material to control the redox potential substantially at or below a selected potential at which the metal is leached preferentially with respect to other metals in the material. Nickel is leached preferentially with respect to copper and precious metals in a matte, for example, to produce a nickel-rich solution and to concentrate the precious metals in a nickel-depleted residue. The leach residue, or other concentrates containing copper and precious metals may also be treated by the method to selectively dissolve the copper values preferentially to the precious metal values. Dissolved copper in the nickel-bearing leach solutions may be precipitated in a separate tank by agitating the leach solution in the presence of elemental sulphur and nickel sulphide particles having an atomic ratio of nickel to sulphur greater than one, thereby producing copper sulphide and a substantially copper-free nickel-chloride solution which can be separated and the values recovered by conventional means.

7 Claims, 5 Drawing Figures

CHLORINE LEACH PROCESS

This invention relates to the recovery of metal values from solid particles by chlorine leaching, and more specifically to separation and independent recovery of metals in the group including nickel, copper and precious metals, from particles of mattes, sulphide concentrates and alloys by preferential chlorine leaching of one or more metals from the others, and particularly to separation of nickel from copper and of either or both from precious metals.

The patent and general literature describing hydrometallurgical processes for the recovery of metals from solids in chloride solutions is extensive. The processes relate to recovery of metals, including substantially all the base metals, from a wide variety of mattes, sulphide concentrates and ores using different combinations of many leaching reagents including chlorine, hydrochloric acid, hypochlorous acid, sodium hypochlorite, ferric chloride, cupric chloride, manganic chloride, sodium chloride, calcium chloride and other alkaline and alkaline-earth metal chlorides.

Few references, however, relate to the use of chlorine and a redox couple, such as cuprous-cupric chloride, to leach mattes, sulphide concentrates and alloys, particularly those containing metals selected from the group nickel, copper, and precious metals, and these will be discussed in detail hereinbelow. Reference is also made to known processes for precipitation of dissolved metal values using sulphur in elemental and combined form.

In U.S. Pat. No. 2,186,293 a process is described for recovery of nickel from matte by leaching in a solution containing cupric chloride and sufficient nickel chloride that the cuprous chloride formed upon dissolution of nickel remains in solution. The leach solution and residue are separated, nickel and copper are recovered from solution by electrolysis, and cupric chloride is regenerated for further leaching by reacting the solution remaining from the electrolysis with the chlorine produced thereby and returning the liquor to the leaching circuit. In addition to dissolution of substantially all the nickel, over 90% of the copper and some of the precious metals are also dissolved and no means are taught for separation of metal values by preferential leaching. Furthermore large volumes of solution must be circulated relative to the matte treated, specifically over 9.3 litres of solution per kilogram of matte which implies high capital and operating costs for solution handling.

In contrast thereto, in the practice of the present invention there is a low flow of solution per unit of solids treated, for example only about 2.5 litres per kg of solids treated. The smaller amount of solution per unit of solids means not only improved economics but also a greater pick-up of metal during leaching.

A process for chlorine leaching of metals from sulphide ores is described in U.S. Pat. No. 1,943,337. The process is similar to that outlined above, but in this case the chlorine is fed to the same vessel in which the ore is treated thereby regenerating the redox leaching agent, such as ferric chloride, as it is consumed. As in the previous patent, however, no reference is made to preferential leaching of one metal from the solids with respect to other metals therein. The object of the process is clearly to leach as much metal value as possible from solids and there is no teaching of the possibility or desirability of preferential (or selective) leaching.

U.S. Pat. Nos. 2,829,966 and 2,835,569 relate to methods for recovery of gold from arsenuireted ores containing nickel, cobalt and iron. Ore is leached in a mixture of HCl and chlorine to dissolve all the base metals, and the progress of the leach is followed by continuous monitoring of the redox potential. After dissolution of all the metals except gold, the continued addition of chlorine to the leach slurry causes an abrupt rise in potential until gold starts to dissolve, after which sufficient additional chlorine is fed to the slurry to dissolve most of the gold. Thus substantially all the metals in the ore are leached and are present together in the same leach liquor from which they must be laboriously separated. No mention is made of either an intention or means to leach one or more (of the base) metals selectively from the others or from the gold.

The lack of reference in these patents to either an interest in or a means for preferential leaching of metals from sulphides is consistent with the general literature on the leaching of sulphides by chlorides and chlorine. In summary, the conclusion may be drawn that the prior art merely recognized that complete dissolution of all metal values in chloride solution is extremely rapid and therefore no attempt has been made to selectively leach one metal relative to another.

Various methods for separation of metals dissolved in aqueous solutions have been described. Referring specifically to the separation of dissolved nickel and copper, for example, one means that is well known in the art is precipitation of copper sulphide under the action of $H_2S$. Another is cementation of copper metal by metallic iron. A variation of this latter scheme is the method described in U.S. Pat. No. 2,180,520, in which the role of iron is replaced by nickel to avoid contaminating the nickeliferous solution with iron. According to the process of this patent, a chloride solution containing both nickel and copper is generated by leaching of matte with cupric chloride, the solution is diluted with water, and is then treated with a nickel-copper matte to precipitate dissolved copper. It is clear from the specification that the copper is precipitated as metal by metallic nickel in the matte, the presence of which is ensured by limiting the sulphur content of the matte to a maximum of one third its copper content. It is presumably for this reason that the initial relatively concentrated chloride leach solution is first diluted since the efficiency of precipitation of copper as metal from solution of high chloride ion concentration is known to be poor. Even after dilution, however, the copper is not completely precipitated in one stage. According to the examples in the patent, sufficient nickel was provided in the added matte to precipitate more than 3,100 kg of Cu while there were only 2,800 kg of Cu in solution to begin with and not all of it was precipitated.

There are references to precipitation of copper under the action of sulphides, particularly iron sulphide, but precipitation is highly inefficient, requiring many times the amount of iron sulphide stoichiometrically required to precipitate all the copper, and it is suspected that the bulk of precipitation which does occur results from the cementing action of metallic iron present in commercially available iron sulphides, rather than from the action of the iron sulphide itself. NiS can replace copper in solution but it is not known to effect substantially complete precipitation of dissolved copper as sulphide; the exchange is only partial. In one account of the precipitation of trace concentrations of copper from nickel-bearing solutions under the action of NiS that is formed in situ by precipitation under the action of sodium sulphide, it is clear that a highly active sulphide is formed by special means and is only useful for precipitation of small concentrations of copper.

There are further references to precipitation of copper as sulphide under the action of metals, particularly iron, in the presence of elemental sulphur, a thermodynamically more effective method than the use of sulphides such as iron sulphide or nickel sulphide. Nickel metal can, like iron, effect precipitation of copper sulphide in the presence of elemental sulphur, but there is no reference, as far as is known to applicant, to precipitation of copper sulphide in the presence of elemental sulphur by nickel sulphide with an atomic ratio of nickel to sulphur greater than one, such as that present in some nickeliferous mattes.

Thus, the prior art appears to be silent on processes either for preferential chlorine leaching of certain metal values from others in mattes, sulphide concentrates or alloys suspended in chloride solutions, or for separation of copper from nickel in solution under the action of elemental sulphur and nickel sulphide with an atomic ratio of nickel to sulphur greater than one.

It has now been discovered that by controlling the redox potential of the leach solution at specific values one metal in the material can be leached to a greater extent than another metal therein, and means are provided according to the practice of this invention to effect such control and thereby achieve preferential leaching of a selected metal. The control means are based on the discovery that the redox potential can be controlled at will by controlling the feed rate of chlorine to the solution relative to the feed rate of material thereto. Thus according to this invention such control of feed rates is effected to establish redox potentials at which a selected metal in the material is leached preferentially with respect to other metals therein, thereby advantageously effecting a separation of one metal from others in the same material.

It is, therefore, an object of the present invention to overcome the disadvantages of the prior art and provide a process for preferential chlorine leaching of a metal from others in mattes, sulphide concentrates, alloys and the like.

Another object of the invention is to provide a process for selectively leaching nickel from copper and of either or both of them from precious metals in the solid particles.

Yet another object is to provide an improved process for separating copper from nickel dissolved in solution.

Precious metals are referred to hereinafter as PM's and the term will be understood to refer collectively to metals selected from the group gold, and the six platinum group metals, namely platinum, palladium, rhodium, ruthenium, osmium and iridium.

Further reference herein to redox electrodes and to redox potentials will be understood to refer to a Pt-saturated calomel electrode pair unless stated otherwise.

By one aspect of the present invention there is provided a process for recovering metal from particulate sulphidic and metallic materials containing metals selected from the group comprising nickel, copper and precious metals, by chlorine leaching the material as an agitated slurry in a cuprous ion-bearing aqueous chloride solution, the redox potential of which increases upon feeding chlorine thereto and decreases upon feeding particulate material thereto, the improvement for leaching a metal preferentially with respect to other metals in the material comprising, (i) controlling the rate of feeding of chlorine relative to the rate of feeding of material to the solution such that the redox potential of the solution is controlled substantially at or below a selected potential at which the metal is leached preferentially with respect to other metals in the material, and (ii) leaching the metal from the material thereby producing a leach solution and a leach residue.

By another aspect there is provided a process for precipitating copper sulphide from nickeliferous solution containing dissolved copper comprising, (i) feeding nickel sulphide having an atomic ratio of nickel to sulphur greater than one to the nickeliferous solution and forming an agitated slurry thereof, (ii) reacting the nickel sulphide with dissolved copper in the solution in the presence of elemental sulphur, thereby precipitating copper sulphide and dissolving nickel in the nickeliferous solution, (iii) withdrawing copper sulphide and copper-depleted solution from the slurry, (iv) separating the copper sulphide from the copper-depleted solution, and (v) recovering nickel from the copper-depleted solution.

By yet another aspect there is provided a process for recovering nickel from particulate sulphidic and metallic materials containing metals selected from the group comprising nickel, copper and precious metals by chlorine leaching the material as an agitated first slurry in a cuprous ion-bearing aqueous chloride solution, the redox potential of which increases upon feeding chlorine thereto and decreases upon feeding particulate material thereto comprising, (i) controlling the rate of feeding of chlorine relative to the rate of feeding of material to the solution such that the redox potential of the solution is controlled substantially at or below a selected potential at which nickel is leached preferentially with respect to copper and precious metals in the material, (ii) leaching nickel from the material thereby producing a nickel leach solution and a leach residue, (iii) withdrawing nickel leach solution and leach residue from the first slurry and forming a second agitated slurry thereof, (iv) feeding particulate nickel sulphide having an atomic ratio of nickel to sulphur greater than one to the second slurry, (v) reacting the nickel sulphide with dissolved copper in the nickel leach solution in the presence of elemental sulphur, thereby precipitating copper sulphide and dissolving nickel in the nickel leach solution, (vi) withdrawing copper sulphide and copper-depleted solution from the second slurry, (vii) separating copper sulphide from the copper-depleted solution, and (viii) recovering nickel from the copper-depleted solution.

The invention will be more clearly understood by reference to the following drawings.

Figure 1:
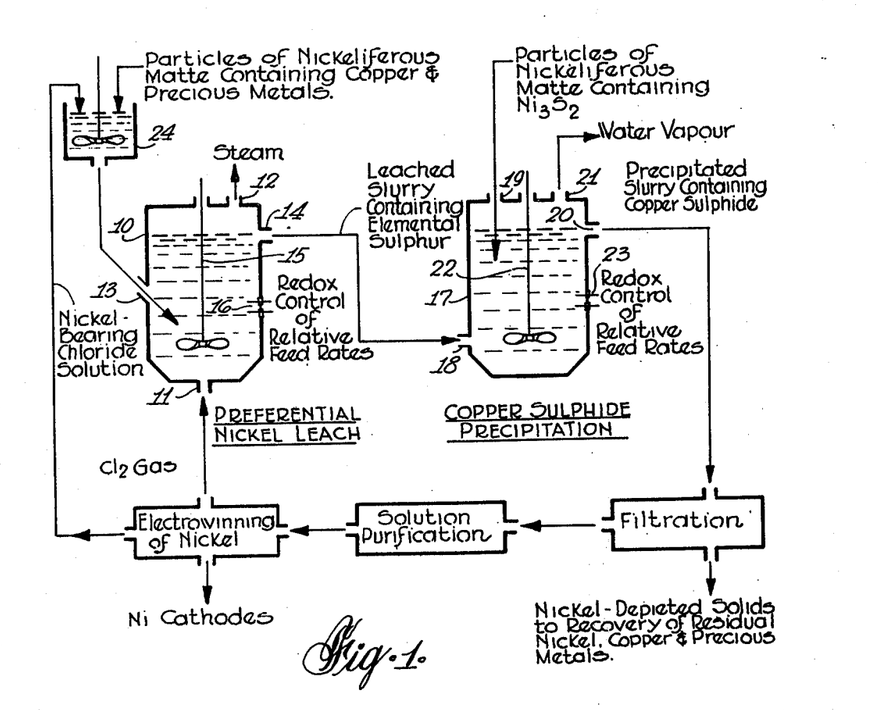
FIG. 1 is a schematic representation of a particular process embodying both parts of the present invention.

FIG. 1 illustrates a particular embodiment of the present invention as it applies advantageously to recovery of metal values from nickeliferous mattes containing copper and PM's. The process utilizes the continuous aspects of the invention in the form of preferential chlorine leaching of nickel from copper and PM's in the matte followed by precipitation of dissolved copper as copper sulphide from the nickel chloride leach solution.

The preferential nickel leach is carried out in a vessel, 10, equipped with a gas entry port 11, a gas exit port 12, solution and solids entry port 13, slurry exit port 14, a rotatable impeller, 15, and a pair of reference electrodes 16. In operation the vessel contains a slurry of matte particles and an aqueous chloride solution containing dissolved nickel and copper. The chloride ion concentration of the solution is sufficiently high that the copper exists in the cuprous state, largely as anionic chloride complex ions. Chlorine is fed to the leach vessel, preferably through the bottom and under the impeller to ensure effective contact and dispersion therein. Matte particles are fed to the vessel conveniently through its side and preferably near to the impeller to ensure effective distribution and suspension of the particles in the solution. Chlorine reacts rapidly and exothermically with the solution by oxidizing dissolved cuprous copper to the cupric state and simultaneously cupric ions are reduced to the cuprous state, also exothermically, by leaching metal from the particles. The ratio of cuprous and cupric copper in solution very largely determines the redox potential generated between the electrodes, conveniently but not necessarily a platinum-saturated calomel electrode pair.

The redox potential is monitored and the feed rate of chlorine is controlled relative to the feed rate of matte particles to establish a redox potential at which nickel is leached preferentially with respect to copper and PM's. That is to say the ratio of concentration of nickel to copper or PM's in the leached particles is less than the corresponding ratio in the original matte feed. This definition does not preclude some leaching of copper or PM's, although substantially no PM's are leached in practice. Some copper is leached, however, and the proportion increases with the redox potential, as will be discussed in more detail subsequently. For present purposes it is sufficient to describe a particular set of condition to illustrate the practice of the invention.

Thus for a particular nickeliferous matte it has been found that when the relative feed rates of matte and chlorine are controlled to maintain a redox potential of about 315 mv about 80% of the nickel is leached from the matte and only about 20% of the copper. There is no detectable dissolution of PM's whatever. The amount of heat generated by the leaching operation is sufficient that the solution boils and steam is evolved through the off-gas exit port 12. The reaction of chlorine in the slurry is so efficient that chlorine concentrations in the off-gas are only a few parts per million at most, while leaching occurs at the maximum rate that can be achieved in an unpressurized vessel, and at substantially constant temperature. The boiling point of the solution varies with the concentration of dissolved chlorides, of course, but in a continuous system in which leach slurry is withdrawn from the vessel as solution and fresh matte are fed to it, leaching occurs under nearly steady-state conditions and the temperature of the slurry is therefore substantially invariant.

As metal sulphides in the matte are leached and metal is dissolved, the associated sulphide sulphur is transformed in the slurry to an elemental form. Leach slurry withdrawn from the vessel therefore consists of leach solution preferentially enriched in nickel, and particles of leach residue containing elemental sulphur. It is this slurry that is treated according to the precipitation or second aspect of this invention for separation of dissolved copper as sulphide from the leach solution by reacting the solution in the presence of elemental sulphur with nickel sulphide in which the atomic ratio of nickel to sulphur is greater than one, such as the $Ni_3S_2$ occurring in some nickeliferous mattes. The particular combination of the higher nickel sulphide with elemental sulphur is essential for the practice of this part of the invention.

The copper sulphide precipitation is carried out in a vessel, 17, equipped with a leach slurry entry port, 18, a nickeliferous matte entry port, 19, a copper precipitation slurry exit port, 20, a gas off-take port, 21, a rotatable impeller, 22, and advantageously an electrode pair, 23, for the measurement of redox potential. Nickel leach slurry containing elemental sulphur and particles of nickeliferous matte containing $Ni_3S_2$, are both fed to the vessel through their respective entry ports and dissolved copper in this solution is precipitated in sulphide form. It has been found that a relationship exists between the redox potential in the slurry and the concentration of dissolved copper in solution. One particular example of the relationship is presented in FIG. 5, and demonstrates the remarkable sensitivity of dissolved copper concentration to redox potential. Thus at about 50 mv the copper concentration in solution is only about 0.02 g/l; whereas at 300 mv it is about 40.0 g/l, an increase of 2000 times with only a sixfold increase in redox potential. Thus the extent of the precipitation is advantageously controlled by monitoring the redox potential and controlling the relative feed rates of leach slurry and matte to maintain a redox potential at which a selected degree of precipitation is effected, preferably as close to 100% as practicable. The potential is advantageously about 100 mv. The solution, while not necessarily boiling, is nevertheless at an elevated temperature, and water evaporated therefrom is withdrawn through the gas off-take port while reacted slurry is withdrawn through the copper precipitation slurry exit port. When the solution in the withdrawn slurry is substantially devoid of dissolved copper, the net effect of the combined practice of both parts of the invention is dissolution of a major portion of the nickel in the matte treated while retaining substantially all the copper and PM's in the solids.

Following the novel steps of this invention, the copper-free nickel chloride solution may be separated from the solids, advantageously by filtration, further treated for removal of other dissolved impurities such as iron, cobalt, lead, zinc and other minor metal constituents in the matte that might have dissolved, thereby becoming a substantially pure nickel chloride solution, and finally electrolyzed for recovery of nickel therefrom by electrowinning in conventional manner. Chlorine is generated anodically and is usually recycled to the leaching operation, while the nickel-depleted chloride electrolyte may likewise be recirculated to the leaching operation. The matte and solution fed to the leach vessel may thus conveniently and advantageously be brought together in mixing vessel, 24, and fed to the leach operation as a slurry thereby closing the process circuit. The filtered solids can in turn be treated for recovery of the remaining nickel, copper and PM's by known methods.

Thus a process has been described for recovery of nickel, copper and PM's from matte that advantageously embodies both parts of the present invention for separation of nickel from copper and PM's, by preferential leaching of nickel followed by precipitation of electrodissolved copper from the nickel-enriched leach solution. While this embodiment illustrates the combined practice of both parts of the invention, each part may be practiced independently of the other, and each will be described separately and in more detail below.

Figure 2:
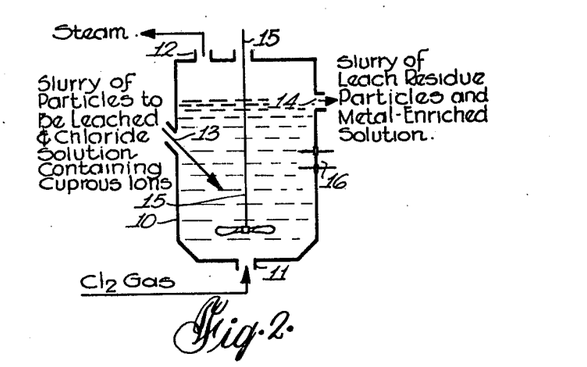
FIG. 2 is a generalized schematic representation of that part of the present invention relating to preferential chlorine leaching of metals from solide particles.

FIG. 2 is a schematic representation of an apparatus in which the preferential chlorine leaching can be carried out. The apparatus as illustrated consists of a closed vessel, 10, a chlorine gas entry port, 11, solid particle and aqueous chloride solution entry port, 13, leach slurry exist port, 14, gas off-take port, 12, rotatable impeller, 15, and a pair of electrodes, 16, for the measurement of redox potential. While the positions of these items as illustrated are advantageous they are not necessarily critical. Thus, for example, the chlorine could enter the side rather than the bottom of the vessel so long as it enters directly into the solution. The redox electrodes could project downwards from the top of the vessel rather than through its side. The gas off-take could be from the side rather than the top of the vessel. The particles to be leached and the leach solution could be fed independently to the vessel through separate entry ports rather than as a slurry through one port as shown, and even as a slurry they could enter the vessel through the top rather than the side. Many variations are thus possible always provided that the chlorine is fed to the vessel below the surface of the solution and the solids are suspended therein.

In starting up a continuous leaching operation an aqueous chloride leach solution containing dissolved copper in the cuprous state is supplied to the vessel and agitated. In leaching nickeliferous materials, chlorine is fed first into the solution with which it reacts rapidly thereby oxidizing cuprous copper to the cupric state and generating heat. Since the redox potential is largely a measure of the cupric/cuprous ratio in the solution, the increase in this ratio by absorption of chlorine is manifested by an increase in the redox potential. Particles are then fed to the agitated solution and as they are leached the redox potential drops indicating a decrease in the cupric/cuprous ratio. Thus when both chlorine and particles are fed simultaneously to the leach slurry at such rates that the redox potential remains constant, it is clear that cupric ions are consumed by the leach reactions as fast as they are produced by the absorption of chlorine so that the cupric/cuprous ratio remains unchanged. If the potential rises it is clear that the cupric/cuprous ratio is higher which means either that the feed rate of chlorine is higher or the feed rate of particles is lower. Whichever the case there is a relative increase in the feed rate of chlorine with respect to that of particles. The effect of such an increase in the concentration of cupric ions is more leaching of the particles, the likely consequence of which is decreased selectively of the leach. Conversely, if the potential drops the availability of cupric ions is less, the consequence of which is less extensive but likely a more selective leach.

Which metals are leached from a given type of particle and to what extents at a particular redox potential is a matter of experience and experimentation. Once the leaching criteria have been established for a particular material by testwork, similar particles can be treated under similar conditions with reproducible and predictable results. Without wishing to be bound by this or any other theory, it is believed that metals leach at given potentials as a function of both the electrochemical properties of the metals themselves and their association in the particles. Generally speaking, it is believed that the least noble metals tend to leach most readily and will therefore dissolve under relatively mild leaching conditions, that is to say at relatively low concentrations of cupric ions or redox potential. Progressively more noble metals are leached as the potential rises and the availability of cupric ions is increased.

Attention is drawn to FIG. 1 of U.S. Pat. No. 2,835,569 wherein such a relationship is depicted. It is also believed, however, that a given metal will leach at a lower potential when present in metallic form that when present in the particles as a sulphide. Thus while it is likely that in particles containing nickel, copper and PM's the order of leaching in progressing from lower to higher potentials will be nickel-copper-PM's, it is equally likely that a more effective separation can be achieved between nickel and copper, for example, if the nickel is present in metallic form and the copper as a sulphide, than the other way around. The same considerations apply to selective leaching of copper from PM's in PM concentrates, and to the separation of one metal from another in alloy particles containing any combination of the above metals.

What is important to emphasize is that for a given type of particle the leach under given conditions is predictable, can be preferential for one or more metals with respect to others, and can be controlled according to the practice of this invention to achieve a particular predictable result.

Control of redox potential during leaching is achieved by controlling the relative feed rates of chlorine and particles to the leach slurry. While such control could be exercised in a variety of ways including crude manual adjustment of feed rates made from time to time in response to periodic measurement of potential, the most effective control is automatic and continuous. In continuous operation the feed rate of the solids is advantageously fixed, and the flow of chlorine continuously adjusted to maintain a set potential by an electrically operated valve in the chlorine line. The valve is connected to a potential-recording device and activated by an electrical signal from it in accordance with any difference between the actual and set potential. Thus if the actual potential rises above the set potential the flow of chlorine is automatically decreased and the potential drops. Conversely if the actual potential falls below the set potential the flow of chlorine is automatically increased and the potential rises. In this manner the actual potential fluctuates closely about the selected potential and the leach is controlled to provide predictable results.

While the present invention can be applied in general to the separation of one or more metals from other metals in sulphide or metallic form, it is of particular interest for the separation of nickel from copper or of either or both from PM's in mattes, sulphide concentrates and alloys. The invention may also be applied to the separation of individual PM's from one another.

It will be recognized that some mattes and concentrates, particularly those of nickel and copper, contain considerable concentrations of iron, and while the invention can be applied to the treatment of such materials, it is particularly well suited to the treatment of low-iron mattes and concentrates such as described herein. PM mattes and concentrates in general contain little iron and can be treated according to the present invention whether they originate directly from PM ores or from nickel and copper ores containing PM's from which the bulk of the nickel and copper have previously been recovered.

Other materials can also be treated including nickel matte substantially devoid of copper. In this case preferential leaching of nickel with respect to copper is, of course, not an object of the leach but the invention can still be applied advantageously to recovery of the nickel. Since no copper is present in the matte to supply the leach solution with copper ions for leaching, these can be supplied independently and the leach conducted in the manner described at a convenient redox potential. The leach slurry can then be filtered, the solution treated for precipitation of copper, also according to this invention, by using nickel matte and added elemental sulphur. The copper sulphide precipitate can then be recycled to the leach. Thus the copper required for leaching is merely recycled between leaching and precipitation while the feed is a copper-free nickel matte and the product is a copper-free nickel chloride solution.

The leach solution can be any chloride solution containing dissolved copper in the cuprous state. Thus the chloride ion can be provided as hydrochloric acid or as a metal chloride such as nickel chloride, for example, or as a mixture of chlorides. It is important only that sufficient chloride ions be present to permit the presence of dissolved copper in the cuprous state. While HCl can be present in the leach solution it is not necessary and this is one of the major advantages of the present method over HCl leaching of sulphides. In the recovery of nickel from matte, for example, nickel can be selectively leached according to the present invention in a nickel chloride solution substantially devoid of HCl, to form a concentrated nickel chloride solution that can be electrolyzed directly for recovery of nickel by electro-winning without any prior costly neutralization of acid.

The temperature of the leach is advantageously the boiling temperature of the solution. Sufficient exothermic heat is generated by both the absorption of chlorine and the leach reactions to boil the solution. Not only is no additional heat required to effect boiling but heat may have to be removed from the solution by some cooling means to prevent the solution from boiling over. Boiling is an advantage, however, not only because reaction rates are a maximum under atmospheric conditions, but a convenient means of temperature control is automatically provided, and in addition a considerable contribution to the suspension of particles in the leach slurry is provided by the boiling action.

The leaching operation can be conducted in either batch or continuous mode. While continuous operation is preferred as discussed below, particularly for the treatment of large tonnages of nickel-copper matte, for example, batch or semi-continuous operation is quite appropriate for the relatively small quantities of some materials such as PM mattes or concentrates. Whether the leach is conducted in batch or continuous mode, however, the same method applies — the feeding of chlorine and particles to the leach slurry is controlled to establish redox potentials at which a selected metal is leached preferentially to other metals.

In continuous operation with chlorine and particles being fed continuously to the leach vessel and slurry being removed continuously therefrom, the redox potential is held substantially constant for consistency of results, while in batch operation the redox can vary throughout the leach so long as the redox at the end of the leach is at or below the preselected value. Thus batch leaching can be done with continuous feeding of chlorine, particles, and solution, as in continuous operation, until the vessel is full, or it can be done by supplying the particles either altogether near the beginning of the leach or from time to time during the leach and feeding chlorine until the redox potential has risen to the preselected value. Thus there can be, and generally are, periods during batch leaching operations when chlorine is fed to the solution while the feed rate of particles is zero. The converse can also occur but is less common.

Since the redox potential rises upon feeding of chlorine and falls upon feeding of particles, it will be understood that with irregular feeding of particles and continuous feeding of chlorine, it is possible for the redox potential to rise above the preselected value from time to time during a batch leach. Addition of further quantities of particles will cause a drop in the redox potential, however, and will tend to reprecipitate metal values that dissolved while the potential was above the preselected value. Thus, while such fluctuation of redox potential is not desirable and can be readily avoided merely by controlling the feeding of chlorine according to the redox potential, it is the final redox potential in a batch leach operation that must be at the preselected value if the predicted results of the leach are to be expected and achieved.

Thus, whether chlorine and particles are fed together at substantially constant rates or separately at varying rates, the relative feed rates of both are controlled to establish a preselected redox potential for the leach. With continuous operation the selected potential is continuously maintained whereas with batch operation it need only exist at the end of the leach and must be established anew in each batch.

Continuous operation is preferred because fluctuations in solution levels, concentrations, temperatures, specific gravities and other properties are minimized and there are no interrupted flows of solid, liquids, or gases. Materials are continuously fed to the system and removed therefrom while conditions within the vessel remain substantially steady. This fact is of particular advantage if the solution fed to the leach vessel contains no copper as in the case with the spent nickel chloride electrolyte described in relation to FIG. 1. In such a case it is clear that with batch operation copper would have to be supplied to each batch of starting solution whereas with continuous operation the leach is only started up once, after which a concentration of copper is retained in the leach solution by the leach itself unless, of course, there is no copper to be leached, as in the case of the copper-free nickel matte described above. In this latter case, of course, copper must be provided from another source, but otherwise the leach solution is not dependent on recirculated solution for copper.

While it is recognized that in theory chlorine leaching can be effected under the action of any redox couple including ferric-ferrous, manganic-manganous and others, this discussion is limited to the use of the cupric-cuprous couple because copper is more noble than nickel and can therefore be separated conveniently from nickel by precipitation according to this invention. Because copper is the leaching agent it must of course remain in solution for leaching to occur and this is the reason why, in starting up a leach of nickeliferous matte, for example, chlorine is fed to the solution before the matte particles. By this means the presence of cupric ions is ensured. When particles are fed before chlorine, cupric ions in solution are consumed immediately by leaching of nickel, for example, from the particles and the resulting cuprous chloride is in turn reduced and copper precipitated. When chlorine is then supplied to such a solution devoid of cuprous copper, it simply passes through the solution unabsorbed and no leaching occurs.

Figure 4:
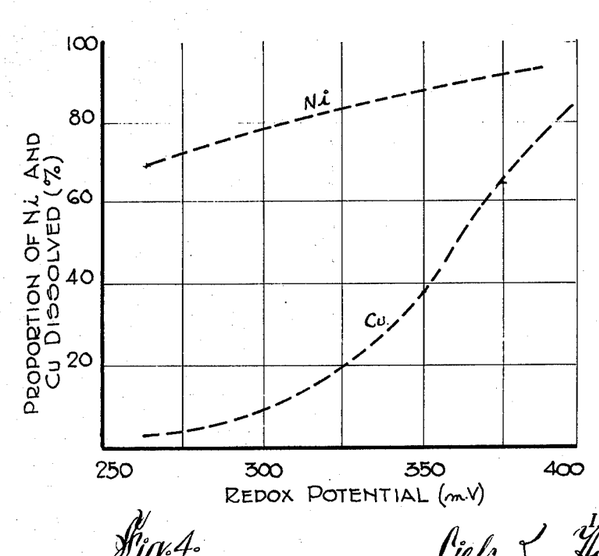
FIG. 4 is a graphical illustration of the effect of redox potential on the separation of nickel from copper by chlorine leaching of a particular nickel-copper matte according to this invention.

The particular redox potential that is maintained depends on both the type of particles being leached and the object of the leach. In the process of FIG. 1, for example, in which it is intended to leach nickel preferentially with respect to copper and PM's in a nickel-copper matte, FIG. 4 illustrates clearly the relationship between redox potential and leach selectivity for chlorine leaching of a particular nickel-copper matte. It can be seen that at a potential of about 315 mv about 85% of the nickel is leached but only about 15% of the copper. At lower potentials less metal is leached but a greater proportion of it is nickel. At 280 mv, for example, about 75% of the nickel is leached but only about 5% of the copper. At higher potentials the reverse is true; thus, at about 350 mv, for example, about 90% of the nickel is leached with about 40% of the copper. As the potential is allowed to rise, more and more nickel and copper are dissolved and the leach becomes progressively less selective for nickel with respect to copper. The upper limit for selectivity of nickel over copper from the above matte is about 400 mv. In low copper mattes selectivity against copper is not a problem, and redox potentials can therefore be as high as about 500 mv or so before significant dissolution of PM's occurs. In the absence of PM's as well, potentials can go as high as 1,000 mv but substantially all dissolved copper is then in the cupric state and the solution therefrom has no capacity to absorb chlorine beyond that corresponding to the leach rate. Thus chlorine might begin to appear in the off-gases and in addition sulphation increases with redox potential, both features representing process inefficiencies. The lower practical limit of redox potential is about 250 mv. At potentials below about 250 mv there is not enough copper in solution to absorb sufficient chlorine and generate sufficient cupric ions to sustain sufficient leach rates and throughput. In summary, there is just not enough leaching agent available below about 250 mv to sustain an acceptable leaching operation. The redox limits quoted above and in FIG. 4 apply to a specific matte and could be different for another material. Particular limits are established by experiment and thereafter can be used for control purposes to achieve a predictable result in the treatment of a particular material. In the treatment of certain PM concentrates containing copper and only minor or negligible concentrations of nickel, separation of copper from PM's is effected by conducting the leach at potentials up to about 450 mv or so, under which conditions copper is substantially completely dissolved while PM's are retained and concentrated in the leach residue. The elemental sulphur resulting from the leaching of copper sulphide is removed from the leach residue conveniently by dissolution in a sulphur solvent such as trichloroethylene and the PM's are then recovered by leaching in aqua regia and precipitation by known methods.

Figure 3:
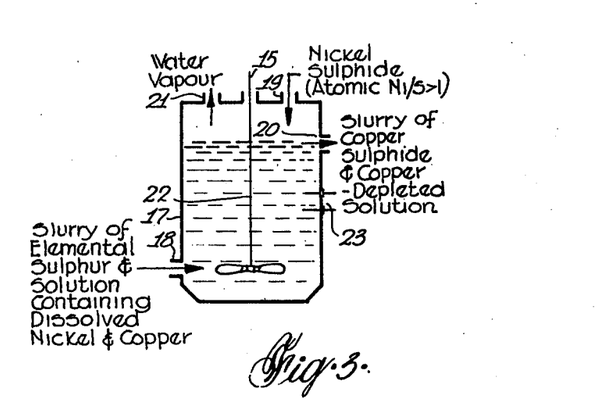
FIG. 3 is a schematic representation of that part of the present invention relating to precipitation of copper sulphide from nickeliferous solutions containing dissolved copper.

FIG. 3 is a schematic representation of an apparatus in which the part of this invention relating to precipitation of dissolved copper from nickel-bearing solutions can be carried out. The apparatus as illustrated consists of a closed vessel, equipped with entry port, 18, for elemental sulphur and nickel-bearing solution containing dissolved copper, entry port, 19, for nickel-sulphide-bearing particles in which the atomic ratio of nickel to sulphur in the sulphide is greater than one, an exit port, 20, for slurry of copper sulphide and copper-depleted solution, a gas exist port, 21, a rotatable impeller, 22, and advantageously an electrode pair, 23, for the measurement of redox potential. As in the case of the apparatus of FIG. 2, the positions of the various items described for the present apparatus need not be as shown in FIG. 3. It is necessary only that means be provided to bring together as an agitated slurry, the solution, nickel sulphide and elemental sulphur, and to remove reacted slurry and water vapour from the vessel.

The solution can be any nickeliferous solution containing copper from which copper can be at least partially precipitated by prior art methods as described above. Concern is largely with the treatment of chloride and sulphate solutions, and particularly with chloride solutions of such chloride ion concentration that dissolved copper is present in the cuprous state, such as solutions resulting from the chlorine leaching of nickeliferous mattes. Nickel sulphide with an atomic ratio of nickel to sulphur greater than one is conveniently supplied in the form of nickeliferous matte containing $Ni_3S_2$, as in the process indicated in FIG. 1. Elemental sulphur can be provided in any convenient form. In a process such as that indicated in FIG. 1, for example, the sulphur is conveniently provided by supplying to the precipitation vessel the sulphur-bearing leach residue resulting from chlorine leaching of a matte. In the absence of such a sulphur-bearing material, however, sulphur in some other form may be used, such as, for example, sulphur flowers.

To effect the precipitation of dissolved copper from nickeliferous solutions according to this invention, the solution, nickel sulphide, and elemental sulphur are brought together as an agitated slurry and copper is precipitated as copper sulphide. The temperature is not critical but the higher it is, of course, the faster is the rate of precipitation. Reacted slurry is removed from the vessel and filtered, thereby separating a copper sulphide precipitate, and a copper-depleted nickeliferous solution. Any portion of the dissolved copper can be precipitated but the principal advantage of this invention is that substantially all the copper can be precipitated from solution. This is of particular advantage in the treatment of chloride solutions of high chloride ion concentration in which copper is dissolved in the cuprous state, and from which complete precipitation of copper in metallic form cannot be accomplished.

The extent of copper precipitation can be effectively controlled by control of the redox potential of the solution. It has been discovered that the redox potential of a solution in contact with solid sulphides is a measure not only of the cupric/cuprous ratio but also of the absolute concentration of dissolved copper. The lower the redox potential, the lower the cupric/cuprous ratio and the lower the total concentration of dissolved copper. Thus if the feed rate of solution to the vessel is increased relative to that of nickel sulphide and elemental sulphur, copper concentration in solution will rise and so, therefore, will the redox potential. Conversely, if the feed rates of nickel sulphide and elemental sulphur are increased relative to that of solution, the copper concentration in solution will fall and so will the redox potential.

By monitoring the actual redox potential and adjusting the relative feed rates of solution, nickel sulphide and elemental sulphur with respect thereto to maintain a preselected potential, the extent of copper precipitation and the resulting copper concentration of the solution are controlled at will. In the treatment of a nickel chloride solution containing about 40 g/l of dissolved copper, for example, it was found that when nickeliferous matte containing $Ni_3S_2$ was supplied for precipitation and the relative feed rates were controlled to maintain the redox potential at about 100 mv, the residual copper concentration in solution was a maximum of about 0.2 g/l and in some cases was as low as about 0.020 g/l, thereby indicating precipitation of at least about 99.5% of the copper. When the feed rate of matte was decreased, however, such that the redox potential was increased to about 250 mv, the residual copper concentration of the solution was about 10 g/l, thereby indicating precipitation of only about 75% of the copper. Conversely when the feed rate of matte was increased to produce a redox reading of about 50 mv, the copper was substantially completely precipitated to a residual copper concentration in solution of at most about 0.050 g/l and as low as about 0.010 g/l. This relationship between redox potential and concentration of dissolved copper is more clearly illustrated in Table 9 and in FIG. 5.

Redox control is of particular advantage when applying the invention to the substantially complete precipitation of copper because oversupply of reagents is avoided. When more nickelsulphide is fed to the solution than is needed to precipitate the dissolved copper to a selected residual copper concentration, for example, the redox reading falls and the supply of nickel sulphide is automatically cut back by similar control means to those described above in relation to FIG. 2. Thus, the minimum amount of nickel sulphide is used and consequently the minimum amount of residual nickel remains in the copper sulphide precipitate.

The mechanism of the precipitation is not definitely known, but because precipitation of copper by nickel sulphide with an atomic ratio of nickel to sulphur greater than one is not effected in the absence of elemental sulphur, the reaction mechanism for precipitation of cuprous sulphide from high chloride solution by $Ni_3S_2$ and elemental sulphur is believed to be:

$$Ni_3S_2 + S \leftrightarrows 2\ NiS + Ni^{2+} + S^{2-} \qquad (1)$$

$$S^{2-} + 2\ Cu^+ \leftrightarrows Cu_2S \qquad (2)$$

According to this mechanism the precipitation occurs by the continuous generation and consumption of $S^{2-}$ ions, the net effect of which is:

$$Ni_3S_2 + 2\ Cu^+ + S \leftrightarrows 2\ NiS + Ni^{2+} + Cu_2S \qquad (3)$$

A similar reaction can be written for cupric copper precipitating as CuS from sulphate solutions or low chloride solutions which cannot support cuprous chloride anionic complexes. Even if this mechanism is correct, it accounts for only one third of the nickel in $Ni_3S_2$ whereas it is known that the consumption of nickel as $Ni_3S_2$ extends in some cases to more than 50%. It is therefore to be expected that some precipitation of copper occurs by exchange with NiS resulting from reaction (1) according to the reaction:

$$NiS + 2\ Cu^+ \leftrightarrows Cu_2S + Ni^{2+} \qquad (4)$$

In the absence of elemental sulphur, precipitation of copper by $Ni_3S_2$ occurs presumably according to some reaction such as:

$$Ni_3S_2 + 2\ Cu^+ \leftrightarrows 2\ NiS + Ni^{2+} + 2\ Cu \qquad (5)$$

It is a matter of record, however, that no significant precipitation of copper does occur by $Ni_3S_2$ in the absence of sulphur and it appears, therefore, that the equilibrium concentration of copper metal in reaction (5) is negligible. The additional thermodynamic drive to form copper sulphide in the presence of elemental sulphur as in reaction (3) is apparently necessary to effect precipitation of copper by $Ni_3S_2$.

In using a nickeliferous matte containing $Ni_3S_2$ as a precipitant for copper according to this invention, it has been found that some copper is precipitated in the absence of elemental sulphur, but this precipitation is attributed to the effect of metallic nickel also present in the matte rather than to an effect of $Ni_3S_2$ according to a reaction such as (5) above.

While $Ni_3S_2$ is apparently effective in precipitating copper as sulphide only in the presence of elemental sulphur, the overriding advantage of $Ni_3S_2$ is that by its use substantially all dissolved copper can be precipitated whereas only partial precipitation can be effected by exchange with NiS or by cementation with metallic nickel. The advantage of $Ni_3S_2$ is particularly significant in the treatment of high-chloride solutions in which dissolved copper is present in the cuprous state because in such solutions metallic nickel can reduce copper in solution to only about 2 grams per litre. Even when the solution is diluted to decompose cuprous complexes to cupric ions, metallic nickel is not as effective in precipitating copper metal as is $Ni_3S_2$ together with elemental sulphur in precipitating copper sulphide.

Thus a method and a possible mechanism therefor has been described for precipitation of copper as sulphide from nickel-bearing solutions by the combined action of elemental sulphur and nickel sulphide with an atomic ratio of nickel to sulphur greater than one. Such nickel sulphide is conveniently available in nickeliferous matte in which nickel is present as $Ni_3S_2$. The notable advantage of the method is its capacity for substantially complete precipitation of copper from chloride and sulphate solutions and particularly chloride solutions of high chloride ion concentration in which dissolved copper is present in the cuprous state such as solutions resulting from the chlorine leaching of nickeliferous mattes.

It will be understood that while both parts of the present invention can be combined advantageously in the practice of a process such as that described in relation to FIG. 1, both parts can also be practised independently. Thus the chlorine leaching part can be applied, for example, to separation of copper from PM's in sulphidic or metallic materials that contain little if any nickel, and to which the precipitation part of the invention therefore has no relevance. Conversely the copper sulphide precipitation part can be applied, for example, to precipitation of copper from nickeliferous sulphate solutions that clearly do not derive from the practice of the chlorine leaching part of this invention. The following examples illustrate specific practices of each part of the invention independently and of both parts combined.

EXAMPLE 1

The independent practice of the leaching part of this invention is advantageously applied to selective chlorine leaching of copper from PM concentrates and mattes. Such materials may derive from a variety of sources, notably PM ores and nickel and copper ores containing PM's. From PM ores a PM concentrate or matte may be recovered directly whereas from nickel and copper ores it is recovered indirectly following prior recovery of the bulk of the nickel and copper. In the case of nickel ores in which the last stage of nickel recovery is electrorefining of soluble nickel anodes, for example, the anode slimes constitute a PM concentrate. Whatever the source of the PM concentrate or matte, the bulk of any nickel therein is advantageously recovered prior to application of the present invention for separation of copper and PM's. A PM matte resulting from treatment of a PM ore containing nickel and copper had the following analysis in wt%:

| Ni | Cu | Fe | S | PM's |
|----|-----|-----|------|------|
| 37 | 20.5 | 9.9 | 27.0 | ~0.1 |

The figure for PM's is the total of Au + Pt + Pd + Rh + Ru + Ir. The nickel was first recovered by preferential leaching in HCl solutions according to the method described in U.S. Pat. No. 3,085,054, and the resulting leach residue had the following analysis in wt%:

| Cu | Ni | Fe | S | PM's |
|----|-----|-----|------|------|
| 73.7 | 0.2 | 1.7 | 18.9 | ~0.5 |

A series of chlorine leach tests was performed to illustrate the effect of redox potential on dissolution of copper and PM's from this material. In each test 100 g of the leach residue were treated in one litre of leach solution analyzing in g/l:

| $Cu^+$ | Ni | NCl |
|--------|-----|-----|
| 5 | 50 | 50 |

Chlorine was fed to the slurry at a rate of 70 ml/min and the temperature was controlled at 100°C. The slurry was continuously agitated and redox measurements were made between a Pt - saturated Ag/AgCl electrode pair. The initial redox potential in each case was about 250 mv and rose to successively higher final potentials as leaching was continued for successively longer times in each test. The residues resulting from these leach tests were then analyzed to indicate the proportions of the various metals that were leached in each case and these percentages are tabulated below as a function of the corresponding final redox potential.

TABLE 1

PERCENTAGE OF METALS LEACHED VERSUS FINAL REDOX POTENTIAL

| Redox Potential mv | Base Metals | | | Precious Metals | | | | | |
|---|---|---|---|---|---|---|---|---|---|
| | Cu | Ni | Fe | Au | Pt | Pd | Rh | Ru | Ir |
| 480 | 99 | 25 | 50 | <0.3 | <0.1 | <0.5 | 0.8 | 1.0 | — |
| 515 | 99 | 50 | 80 | <0.5 | <0.5 | <1.0 | 1.0 | 1.0 | — |
| 615 | 99 | 70 | 90 | 21 | 3 | 60 | 41 | 75 | — |

These data indicate clearly that although substantially all the copper was dissolved at 480 mv, there was substantially no dissolution of PM's at 515 mv. Thus, copper and PM's can be almost totally separated by maintaining the redox potential at about 500 mv (equivalent to about 450 mv using Pt-saturated calomel electrodes).

EXAMPLE 2

In the recovery of PM's from nickel anode slimes, the slimes were first smelted with iron suphide and borax to slag off silica and other gangue constituents. The resulting PM matte had the following composition in wt%:

| | | | | | Precious Metals | | | | | |
|---|---|---|---|---|---|---|---|---|---|---|
| Cu | Ni | Fe | S | $SiO_2$ | Au | Pt | Pd | Rh | Ru | Ir | Total |
| 53.5 | 7.2 | 4.0 | 20.5 | <1.0 | 0.21 | 0.44 | 0.49 | 0.20 | 0.13 | <0.1 | 1.57 |

The matte was ground to pass 85 Tyler mesh and 100 g was suspended in one litre of leach solution containing 5 g/l univalent copper and 20 g/l HCl. The temperature of the solution was maintained at 97°C, chlorine was fed to the slurry at a rate of 80 ml $Cl_2$/minute, and leaching was continued until the redox potential reached 510 mv as measured by Pt-saturated Ag/AgCl electrodes. Another test carried out under identical conditions was continued until the potential reached 525 mv. The percentage dissolutions of the various metals are shown in Table 2.

TABLE 2

PERCENTAGE DISSOLUTION OF BASE METALS AND PM'S VERSUS FINAL REDOX POTENTIAL

| Redox Potential mv | Base Metals | | | Precious Metals | | | | | |
|---|---|---|---|---|---|---|---|---|---|
| | Cu | Ni | Fe | Au | Pt | Pd | Rh | Ru | Ir |
| 510 | 95 | 80 | 48 | <0.1 | <0.1 | <0.1 | <0.1 | 0.5 | — |
| 525 | ~100 | ~100 | 70 | <0.1 | <0.1 | <0.1 | <0.1 | 0.3 | — |

The data show that while practically all of the copper in the matte was dissolved, substantially no dissolution of PM's occurred. They were concentrated in the leach residue as a higher grade PM concentrate with the following composition in wt%.

| | | | | | Precious Metals | | | | | |
|---|---|---|---|---|---|---|---|---|---|---|
| Cu | Ni | Fe | S | $SiO_2$ | Au | Pt | Pd | Rh | Ru | Ir | Total |
| 3.5 | 3.6 | 0.3 | 85 | 0.6 | 0.8 | 2.0 | 2.1 | 0.9 | 0.5 | 0.3 | 6.6 |

The concentrate was largely sulphur, a major portion of which was in elemental form and removable in a variety of ways including roasting at low temperatures, sublimation in a stream of nitrogen, reaction with hydrogen to $H_2S$, dissolution in carbon disulphide or sodium sulphide, reaction with sodium sulphite to sodium thiosulphate, and extraction with trichloroethylene.

As a result of sulphur removal, the PM's were further upgraded in the remaining solids from which they could be leached in aqua regia and separately recovered therefrom by known methods. In fact a particular advantage of the application of this invention to the treatment of sulphidic PM concentrates and mattes is that all the PM's are present in a form soluble in aqua regia from which they can be readily and separately recovered. In existing processes for recovery of PM's from such materials only gold, platinum and palladium are directly soluble in aqua regia. The other platinum group metals are rendered insoluble in aqua regia and must be additionally treated before they can be separately recovered.

EXAMPLE 3

Another method of concentrating the PM's in nickel anode slimes is to smelt the slimes, cast what is generally referred to as a PM anode, and electrolyze the anode to recover nickel and thereby produce an upgraded PM concentrate referred to as PM anode slimes. A sample of such slimes was chlorine-leached in a manner similar to the procedures described in the previous examples, and the solution was analyzed for both univalent and divalent copper at various redox potentials as measured between Pt-saturated Ag/AgCl electrodes. The results are tabulated below:

TABLE 3

CONCENTRATIONS OF COPPER IN SOLUTION VERSUS REDOX POTENTIAL

| Redox Potential mv | Concentration of Dissolved Cu, g/l | | | $Cu^{2+}/Cu^+$ Ratio |
|---|---|---|---|---|
| | $Cu^+$ | $Cu^{2+}$ | Total Cu | |
| 400 | 6.0 | 10.0 | 16.0 | 1.7 |
| 410 | 6.5 | 14.0 | 20.5 | 2.2 |
| 420 | 7.0 | 18.0 | 25.0 | 2.6 |
| 430 | 8.5 | 23.0 | 31.5 | 2.7 |
| 440 | 11.0 | 29.0 | 40.0 | 2.6 |
| 450 | 17.0 | 36.0 | 53.0 | 2.1 |
| 460 | 51.0 | 67.5 | 118.5 | 1.3 |
| 470 | 47.0 | 84.0 | 131.0 | 1.8 |
| 480 | 36.0 | 95.5 | 131.5 | 2.7 |
| 490 | 28.0 | 100.5 | 128.5 | 3.6 |
| 500 | 24.0 | 104.5 | 128.5 | 4.4 |
| 510 | 20.0 | 113.0 | 133.0 | 5.6 |
| 520 | 14.0 | 117.5 | 131.5 | 8.4 |
| 530 | 10.0 | 121.0 | 131.0 | 12.1 |
| 540 | 7.0 | 124.0 | 131.0 | 17.7 |
| 550 | 6.5 | 125.0 | 131.5 | 19.2 |

The data indicate that leaching of copper from the slimes was substantially complete at 470 mv as the total Cu in solution did not increase beyond 131 g/l Cu. The concentration of univalent copper reached a maximum at 460 mv and thereafter the effect of continued chlorine addition was apparently, merely to oxidize cuprous copper to the cupric state. The cupric-cuprous ratios are given the righthand column of the table and as it is known from the previous examples that PM's in such materials do not dissolve substantially below about 515 mv, it is concluded that while dissolution of copper is substantially completed at a $Cu^{2+}/Cu^+$ ratio less than 3, PM's do not dissolve significantly at a ratio less than about 6 or 7.

EXAMPLE 4

The PM-bearing materials in the previous examples were sulphidic concentrates and mattes. It is instructive to record the outcome of chlorine leaching on similar materials after reduction to the metallic state. A PM anode slime similar to that referred to in Example 3 was roasted at 750°C to remove sulphur and then reduced in hydrogen at 500°C to produce a metallic material with the following composition in wt%.

| Cu | Ni | Fe | S | Au | Pt | Pd | Rh | Ru | Ir |
|---|---|---|---|---|---|---|---|---|---|
| 71.0 | 8.3 | 3.1 | 2.0 | 0.20 | 0.5 | 0.5 | 0.2 | 0.7 | <0.1 |

The leach solution contained 20 g/l Ni and 12 g/l Cu initially and the temperature was maintained at 100°C. The feed rates of chlorine and solids were controlled to maintain a redox potential of 400 mv, (Pt-saturated Ag/AgCl) until 500 g of sample had been added, after which the potential rose as feeding of chlorine was continued. Samples of slurry were taken at 450, 475 and 500 mv and the percentage dissolutions of the different metals at these potentials are tabulated below.

TABLE 4

PERCENTAGE OF METALS LEACHED VERSUS REDOX POTENTIAL

| Redox Potential mv | Base Metals | | | Precious Metals | | | | | |
|---|---|---|---|---|---|---|---|---|---|
| | Cu | Ni | Fe | Au | Pt | Pd | Rh | Ru | Ir |
| 450 | 73 | 50 | 13.5 | <0.03 | — | <0.1 | 3.7 | 0.9 | 2 |
| 475 | 77.5 | 58 | 15.5 | 0.09 | 0.05 | <0.1 | 4.8 | 1.4 | 4 |
| 500 | 89 | 62 | 48 | 0.07 | <0.07 | <0.1 | 8.0 | 8.2 | 8 |

Comparison of these data with those in Table 2 reveals that while dissolutions of Au, Pt and Pd were little different in the reduced than in the sulphidic material, the dissolutions of Rh, Ru and Ir in the reduced material were over 8% at 500 mv whereas in the sulphidic material they were only a few tenths of a percent even at 525 mv. This test emphasized the preferred separation of base metals from PM's in sulphidic materials and the importance of the form in which the Pm's are present in the concentrate on their behaviour in the chlorine leach.

The four examples above indicate the variety of PM-bearing materials to which this invention can be applied for preferential chlorine leaching of copper and the simultaneous concentration of PM's in the leach residue from which they can be recovered, after removal of sulphur, by dissolution in aqua regia and precipitation therefrom. For the sake of completeness it is pointed out that while silver was present in the materials treated, it is not included in reference to PM's because it dissolves to a large extent along with copper and is recovered from solution by cementation.

EXAMPLE 5

The independent practice of the copper precipitation part of this invention is illustrated by its application to the separation of dissolved copper from nickel in sulphate solutions. Solution that contained 105 g/l Ni and 40 g/l Cu was treated in three pairs of tests using 150 or 100 gm of a coarse or a fine matte containing $Ni_3S_2$ and metallic Ni having a size distribution of:

| Material | Tyler Screen | | |
|---|---|---|---|
| | +80 | −80 +325 | −325 |
| Coarse | 30% | 40% | 30% |
| Fine | — | 10% | 90% |

One test in each pair was made in the absence of elemental sulphur and the other with 30 g sulphur flowers. For each test the solids were added to one litre of the solution and agitated at 100°C for 2 hours. Operating details are tabulated below together with the copper analyses and weights of copper precipitated.

TABLE 5

REAGENT WEIGHTS AND SOLUTION ANALYSES

| Run No. | Matte Type | g | Sulphur g | Copper in Solution, g/l | | |
|---|---|---|---|---|---|---|
| | | | | Initial | Final | Ppt'd |
| 1 | Coarse | 150 | 0 | 39.5 | 34.8 | 4.7 |
| 2 | | 150 | 30 | 39.5 | .006 | 39.5 |
| 3 | Coarse | 100 | 0 | 40.0 | 37.0 | 3.0 |
| 4 | | 100 | 30 | 40.0 | 12.5 | 27.5 |
| 5 | Fine | 100 | 0 | 40.0 | 36.5 | 3.5 |
| 6 | | 100 | 30 | 40.0 | 13.5 | 26.5 |

It is clear that much more copper was precipitated in the presence than in the absence of elemental sulphur. The mattes had the following compositions in wt%:

| Matte Type | Ni | Cu | S |
|---|---|---|---|
| Coarse | 43.7 | 31.6 | 21.9 |
| Fine | 50.0 | 23.1 | 23.3 |

The balance of the mattes was comprised of iron, cobalt, oxygen and gangue constituents such as silica, alumina and lime. It is well known that the copper and nickel in such low-iron, high-sulphur mattes are present as $Cu_2S$, $Ni_3S_2$ and a Ni-Cu alloy containing about 80% Ni. The division of nickel in the matte between $Ni_3S_2$ and the alloy phase can be estimated conveniently on the basis that all copper is present as $Cu_2S$, the balance of the sulphur is present as $Ni_3S_2$ and the balance of the Ni is present as alloy. As some of the Cu is present as alloy, however, and some of the iron and cobalt are present as sulphide, the basis for the calculation is, of course, not strictly correct, but as the concentration of alloy is relatively small, the amounts of copper, iron, cobalt and sulphur involved are also small and the division of nickel between sulphide and alloy form as indicated by this estimate is therefore relatively accurate.

Thus the amounts of nickel in each run that were present in the matte in sulphidic and metallic form were calculated on the above basis and are tabulated below in Table 6 together with the amounts of copper precipitated, and the equivalent amounts of nickel.

TABLE 6

PRECIPITATION OF COPPER BY $Ni_3S_2$ and METALLIC NICKEL

| Run No. | Nickel in Matte, g | | Cu Precipitated, g | |
|---|---|---|---|---|
| | As $Ni_3S_2$ | As Alloy | Cu | Ni Equivalent |
| 1 | 57.7 | 7.8 | 4.7 | 4.3 |
| 2 | 57.7 | 7.8 | 39.5 | 36.5 |
| 3 | 38.5 | 5.2 | 3.0 | 2.8 |
| 4 | 38.5 | 5.2 | 27.5 | 25.4 |
| 5 | 48.1 | 1.9 | 3.5 | 3.2 |
| 6 | 48.1 | 1.9 | 26.5 | 24.5 |

As the amount of nickel stoichiometrically equivalent to the copper precipitated in the even-numbered runs with elemental sulphur far exceeded the amount of nickel available in metallic form, it is clear that the bulk of the copper was precipitated by $Ni_3S_2$ and elemental sulphur as copper sulphide, thereby substantiating the aforementioned theoretical basis of the present invention. If it is assumed that in Runs 2, 4 and 6 all the nickel present in metallic form was dissolved in precipitating part of the dissolved copper, then the proportion of nickel present in the matte as $Ni_3S_2$ that was equivalent to the balance of the precipitated copper in each case is shown in Table 7 below.

TABLE 7

PROPORTION OF Ni AVAILABLE AS $Ni_3S_2$ FOR Cu PRECIPITATION AND DISSOLVED THEREBY

| Run No. | Cu Precipitated | | Ni Metal Consumed, g | therefore Ni Req'd. as $Ni_3S_2$, g | Ni Present as $Ni_3S_2$, g | therefore Ni as $Ni_3S_2$ consumed, % |
|---|---|---|---|---|---|---|
| | Cu, g | Ni Equiv., g | | | | |
| 2 | 39.5 | 36.5 | 7.8 | 28.7 | 57.7 | 49.7 |
| 4 | 27.5 | 25.4 | 5.2 | 20.2 | 38.5 | 52.5 |
| 6 | 26.5 | 24.5 | 1.9 | 22.6 | 48.1 | 47.0 |

Thus it is clear that about half the nickel in $Ni_3S_2$ was utilized for precipitation of dissolved copper. Calculations indicate that complete precipitation results when the nickel available as $Ni_3S_2$ is about 75% in excess of that equivalent to the cupric copper in solution.

EXAMPLE 6

The combined practice of both parts of this invention may advantageously be applied to preferential chlorine leaching of nickel from mattes, sulphide concentrates and alloys containing copper and/or precious metals followed by separation of dissolved copper and nickel by precipitation of the copper as sulphide. A nickeliferous matte containing both copper and PM's that was treated according to this invention had the following analysis in wt %.

| Ni | Cu | Co | Fe | S | PM's |
|---|---|---|---|---|---|
| 43. | 30. | 0.9 | 1.5 | 22. | ~0.002 |

The matte was ground and fed to a system similar to that described earlier in reference to FIG. 1. The particle size distribution of the matte feed is given below in wt %.

| +35 | −35 +80 | −80 +150 | −150 +325 | −325 | (Tyler mesh). |
|---|---|---|---|---|---|
| 5.1 | 24.5 | 21.8 | 31.8 | 16.8 | |

Spent nickel chloride electrolyte containing 39.4 g/l Ni, and 0.020 g/l Cu was used as solution make-up to the system. This solution and matte were mixed together in a blending tank to form a feed slurry which was fed into the leach slurry in the leach tank at a rate equivalent to 159 litres/hr of solution and 65 kg/hr of matte. Leached slurry was displaced from the tank by feed slurry to maintain a substantially constant volume of about 400 litres of leach slurry therein. Chlorine was fed into the leach slurry through the bottom of the tank at a rate controlled continuously and automatically to maintain a redox potential in the solution of 350 mv. Agitation of the slurry was effected by both an impeller and the boiling action of the solution, while the temperature of the slurry remained substantially constant at the boiling point of about 112°C. Steam was removed from the top of the tank and sampled from time to time for $Cl_2$ analysis. The displacement rate of leached slurry was equivalent to 143 litres/hr of nickel-enriched solution and 32 kg/hr of leach residue. Samples of the leached slurry were filtered and the Solution and residue analyzed with the following results:

| Leached Slurry | Ni | Cu | Co | Fe | S | S° |
|---|---|---|---|---|---|---|
| Ni-Enriched Solution, g/l | 208 | 50 | 3.1 | 4.0 | | |
| Leach REsidue, wt % | 13.0 | 35.6 | 0.76 | 1.2 | 46.7 | 18.8 |

Calculations of the weights of nickel and copper fed to the leach in matte compared to the corresponding weights leaving the leach in residue indicate that 85% of the nickel was leached but only 41.5% of the copper. Cobalt and iron were also leached but PM's remained undissolved. As the chlorine concentration of the steam was characteristically only about 10 ppm, the overall chlorine input rate was readily calculated from solution analysis to be about 34.5 kg/hr. At 350 mv only about 1% of the dissolved copper or less than 0.5 g/l was present in the cupric state and thus nearly 50 g/l of cuprous copper were continuously available for the efficient absorption of chlorine.

The leached slurry was next subjected to a simple but advantageous extension of the process described above in relation to FIG. 1. Rather than being fed directly to the copper precipitation tank it was instead passed through an intermediate holding tank in which it was merely agitated. The retention time was similar to that of the chlorine leaching operation, that is to say about two and one half hours. Since no chlorine was fed to the slurry in the holding tank the temperature was lower, at about 106°C, than that during chlorine leaching. The redox potential was also lower, at about 320 mv, suggesting, as was confirmed by analysis, that the copper concentration in solution was decreased. At the same time there was a corresponding increase in dissolved nickel as shown by the analysis, in the tabulation below, of the solution and solids of the 'exchanged' slurry leaving the holding tank compared to those tabulated above for the leached slurry:

| Exchanged Slurry | Ni | Cu | Co | Fe | S | S° |
|---|---|---|---|---|---|---|
| Solution, g/l | 213 | 41 | 3.2 | 4.6 | | |
| Solids, wt % | 10.6 | 39.2 | 0.71 | 1.1 | 45.7 | 17.6 |

Thus about 9 g/l of copper were precipitated while about 5 g/l of nickel were dissolved thereby achieving additional leaching of nickel without any additional consumption of chlorine and simultaneously effecting partial precipitation of copper. The amounts of copper and nickel exchanged in the holding tank suggest that undissolved NiS in the leach residue reacted with dissolved cuprous copper according to reaction (4) above. Whether this reaction occurred or not the face remains that an additional 2.5% of the nickel in the matte fed to the chlorine leach was dissolved in the holding tank thereby raising overall nickel dissolution to about 87.5%.

The exchanged slurry was then fed to the copper precipitation tank. Nickeliferous matte of the same composition as that given above was fed to the precipitation slurry at a rate controlled to maintain a redox potential of 100 mv, which amounted to 13.0 kg/hr. The temperature of the slurry was about 104°C and retention time was again about 2.5 hrs. Precipitated slurry was displaced from the tank at a rate equivalent to 143 litres/hr of solution and 50.6 kg/hr of solids with the following compositions:

| Precipitated Slurry | Ni | Cu | Co | Fe | S | S° |
|---|---|---|---|---|---|---|
| Solution, g/l | 233 | 0.02 | 3.6 | 4.7 | | |
| Solids, wt % | 12.9 | 45.1 | 0.66 | 1.1 | 34.0 | 3.2 |

Thus substantially all the dissolved copper was precipitated, only 20 mg/l or about 0.05% remaining in solution. If it is assumed that all metallic nickel in the matte was consumed in the precipitation operation, then calculation shows that about 45% of the nickel present as $Ni_3S_2$ in the matte was also consumed together with elemental sulphur.

As some of the nickel in the added matte remained undissolved, the overall net dissolution of nickel was calculated to be just over 80% but this was present in a substantially neutral chloride solution at a high concentration (over 230 g/l Ni) that was substantially free of dissolved copper. After further purification of the solution to remove the remaining impurities the solution was fed to an electrowinning operation for recovery of cathode nickel. The chlorine generated at the anode and the spent electrolyte were both returned to the leaching operation thereby closing the process circuit.

EXAMPLE 7

Matte of a similar composition to that of Example 6 was leached in the same equipment at similar solids and solution flowrates but at various redox potentials. In every case substantially all dissolved copper was subsequently precipitated under the action of additional matte containing $Ni_3S_2$ in the presence of the elemental sulphur generated during leaching. As all the copper in the matte reported in the final solids, the copper was a convenient titre for calculation of the overall proportion of nickel dissolved, as shown in the following tabulation:

TABLE 8

REDOX POTENTIAL OF CHLORINE LEACH VERSUS OVERALL Ni DISSOLUTION

| Redox Potential of $Cl_2$ Leach, mv | Ni/Cu ratio in $Cl_2$ Leach Solution | Matte Added for Cu Precipitation kg | Matte Before Leach | Ni/Cu ratio Solids after Precipitation | Diff. Δ | Overall % Ni Dissolved |
|---|---|---|---|---|---|---|
| 290 | 7.5 | 6.7 | 1.74 | 0.38 | 1.35 | 78.1 |
| 310 | 7.1 | 8.9 | 1.58 | 0.33 | 1.25 | 79.1 |
| 330 | 4.9 | 10.7 | 1.46 | 0.33 | 1.13 | 77.4 |
| 350 | 4.1 | 13.9 | 1.48 | 0.29 | 1.19 | 80.4 |
| 370 | 2.6 | 24.3 | 1.48 | 0.29 | 1.19 | 80.4 |

The effect of increasing redox potential on decreasing the selectivity of the leach for nickel with respect to copper is reflected by the steadily decreasing Ni/Cu ratios in the leach solution with rising redox. Similarly the increasing dissolution of copper with increasing redox is reflected by the increasing amount of matte required for copper precipitation with increasing redox potential of the leach. It will be noted that the overall proportion of nickel dissolved remained relatively constant at close to about 80% regardless of leach redox. Thus the increased proportion of nickel leached initially at increased redox was offset by the increased proportion of undissolved nickel in the larger quantities of matte that had to be provided to precipitate the increased quantities of copper dissolved at the higher redox potentials. Nevertheless the fact remains that about 80% of the nickel in a nickel-copper matte was dissolved according to this invention in a substantially copper-free neutral chloride solution at a concentration of about 250 g/l Ni that was subsequently treated for recovery of nickel by electrowinning without neutralization of acid as is required in most existing leach processes.

EXAMPLE 8

While the copper precipitation operation was advantageously conducted at about 100 mv to ensure residual copper in solution was below about 200 mg/l, the effect of redox on residual copper was demonstrated by the results of a series of runs in which the redox was maintained at different values between about 30 and 300 mv. The operating data for the chlorine leach and exchange operations preceding the copper precipitation are reported separately to avoid confusion. Because the conditions of these operations varied considerably, the variation in residual copper at a particular value of precipitation redox could not be definitely ascribed to any one condition.

TABLE 9

EFFECT OF REDOX POTENTIAL ON COPPER PRECIPITATION

| | |
|---|---|
| Redox Potential of $Cl_2$ Leach | 325 – 330 mv |
| Matte Feed rate to $Cl_2$ Leach | 74.5 – 107.5 kg/hr |
| Solution feed rate to $Cl_2$ Leach | 160 – 260 litres/hr |
| Temperature of $Cl_2$ Leach | 107.5 – 112.5°C |
| Redox Potential of Ni-Cu Exchange | 285 – 310 mv |
| Temperature of Ni-Cu Exchange | 98 – 109°C |

| Redox of Precipitation, mv | Matte to Precipitation, kg/hr | Temp. of Precipitation °C | Residual Cu in Solution g/l |
|---|---|---|---|
| 30 | 21.9 | 73 | 0.016 |
| 50 | 25.6 | 73 | 0.038 |
| 70 | 19.0 | 73 | 0.053 |
| 70 | 18.2 | 73 | 0.013 |
| 90 | 18.7 | 72 | 0.063 |
| 110 | 15.7 | 70 | 0.2 |
| 130 | 17.5 | 70 | 0.16 |
| 150 | 17.5 | 69 | 0.56 |
| 170 | 14.3 | 70 | 1.9 |
| 190 | 11.3 | 70 | 3.7 |
| 210 | 13.1 | 71 | 12.7 |
| 240 | 2.9 | 70 | 19.1 |
| 290 | 0.0 | 68 | 25.7 |

Figure 5:
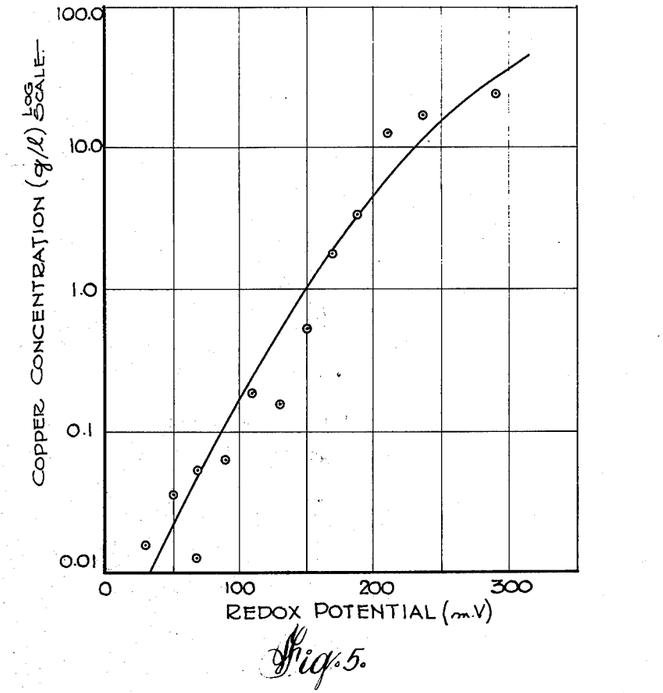
FIG. 5 is a graphical representation of the relationship between redox potential and dissolved copper concentration in chloride leach liquors in contact with particles of a particular nickel-copper matte, on a semilogarithmic scale.

The figures in Table 9 appear in graphic form in FIG. 5 and while there is clearly a spread in copper concentration values at any given redox, the trend to lower copper values at lower redox is striking. Thus while the maximum redox of 290 mv is less than 10 times the minimum value of 30 mv, the maximum residual copper concentration of 25.7 gpl is nearly 2,000 times greater than the minimum value of 0.013 gpl. With such sensitivity to redox, the variation in residual copper at a given redox as shown is not surprising. Clearly the degree of copper precipitation can be controlled according to the practice of this invention merely by maintaining the redox potential at the value corresponding to a selected residual copper concentration in solution. This is achieved by controlling the feed rate of matte relative to that of solution and sulphur. As shown in the tabulation above the redox was increased from less than 50 mv to more than 260 mv by decreasing the matte feed rate from more than 20 kg/hr to nil and thereby increasing the residual copper concentration in solution from less than 0.02 g/l to more than 20 g/l.

EXAMPLE 9

Tests were performed to illustrate the effect of various quantities of coarse matte (as in Example 5) and elemental sulphur on the precipitation of dissolved copper in chloride solution resulting from chlorine leaching of nickeliferous matte. The solution contained 235 g/l nickel and 38.3 g/l copper. Various amounts of matte and sulphur were added to one litre quantities of the solution and the slurries agitated for 2 hours at the boiling point of about 110°C. Representative operating and analytical data are reported below:

TABLE 10

PRECIPITATION OF COPPER FROM CHLORIDE SOLUTION

| Run No | Coarse Matte g | Sulphur g | Copper in Solution, g/l | | |
|---|---|---|---|---|---|
| | | | Initial | Final | Precipitated |
| 11 | 70 | 0 | 38.3 | 33.5 | 4.8 |
| 12 | 47.6 | 25 | 38.3 | 12. | 26.3 |
| 13 | 80 | 25 | 37.0 | 1.0 | 36.0 |

As with the sulphate solutions discussed in Example 5, it is again clear that much more copper was precipitated in the presence than in the absence of elemental sulphur.

The weights of nickel available in the matte as $Ni_3S_2$ and as alloy are tabulated below together with the weights of copper precipitated and the nickel equivalent.

TABLE 11

| Run No | Nickel in Matte, g | | Cu Precipitated, g | |
|---|---|---|---|---|
| | As $Ni_3S_2$ | As Alloy | Cu | Ni Equivalent |
| 11 | 27.0 | 3.6 | 4.8 | 2.2 |
| 12 | 18.3 | 2.5 | 26.3 | 12.3 |
| 13 | 30.8 | 4.2 | 36.0 | 16.7 |

As in Example 5, the conclusion drawn from the data is that without sulphur the small amount of copper precipitated was probably cemented by metallic nickel in the matte whereas the amount of metallic nickel available was nowhere near enough to account for all the copper precipitated in the presence of sulphur. Assuming all the metallic nickel was consumed in Runs 12 and 13, the proportion of nickel present as $Ni_3S_2$ that must have been consumed in precipitating copper was calculated as shown below:

TABLE 12

| Run No. | Cu Precipitated, g | | Ni Metal Consumed, g | therefore Ni Req'd as $Ni_3S_2$, g | Ni Present as $Ni_3S_2$, g | therefore Ni as $Ni_3S_2$ Consumed, % |
|---|---|---|---|---|---|---|
| | Cu | Ni Equiv. | | | | |
| 12 | 26.3 | 12.3 | 2.5 | 9.8 | 18.3 | 53.5 |
| 13 | 36.0 | 16.7 | 4.2 | 12.5 | 30.8 | 40.6 |

These efficiencies are similar to those in Example 5 for sulphate solutions and support the hypothesis that precipitation occurs according to both reactions (3) and (4) referred to above. Whether or not precipitation actually occurs according to these reactions, the surprising fact remains that copper is precipitated under the action of $Ni_3S_2$ in the presence of elemental sulphur, advantageously $Ni_3S_2$ present in nickeliferous matte.

I claim:

1. In a process for recovering metal from solid particles selected from sulphides and alloys and containing at least two metals selected from nickel, copper and precious metals, by chlorine leaching the particles as an agitated slurry in a cuprous ion-bearing aqueous chloride solution, the redox potential of which increases upon feeding chlorine thereto and decreases upon feeding the particles thereto, the improvement for leaching at least one metal preferentially with respect to more noble metal in the particles comprising:

i. controlling the rate of feeding of chlorine relative to the rate of feeding of particles to the solution such that the redox potential of the solution is controlled substantially at a selected potential in the range between 250 mv and 550 mv at which at least one metal is leached preferentially with respect to said more noble metal in the particles, and, ii. producing a leach solution containing at least one metal and a leach residue containing said more noble metal.

2. Process according to claim 1 for leaching in continuous mode comprising, i. withdrawing leach solution and leach residue from the agitated slurry as particles, chlorine and solution are fed to the slurry, and ii. controlling the relative feed rates of chlorine and particles such that the redox potential is continuously maintained substantially at the selected potential.

3. Process according to claim 1 for leaching in a batch mode comprising, i. controlling the relative feed rates of chlorine and particles such that the redox potential is below the selected potential when feeding of particles is completed, and ii. continuing to feed chlorine until the redox potential has risen to the selected potential.

4. Process according to claim 2 in which the selected redox potential is within the range 250 mv to 450 mv and nickel is leached preferentially with respect to copper and precious metals in nickeliferous matte.

5. Process according to claim 3 in which copper is leached preferentially with respect to precious metals in particles selected from precious metal-bearing mattes and concentrates.

6. Process according to claim 1 comprising leaching nickel from substantially copper-free nickel matte and further comprising, iii. separating leach solution from leach residue, iv. precipitating and separating copper from the leach solution, and v. recovering nickel from the leach solution.

7. Process according to claim 6 comprising dissolving the copper precipitate and returning the dissolved copper for leaching further quantities of copper-free nickel matte.

* * * * *